May 14, 1957     M. R. LEONARD     2,792,119
STRAINER CONSTRUCTION FOR CRUDE OIL

Filed Sept. 16, 1953     2 Sheets-Sheet 1

MERL R. LEONARD
*INVENTOR.*

BY *Jacks W. Hayden*

ATTORNEY

May 14, 1957   M. R. LEONARD   2,792,119
STRAINER CONSTRUCTION FOR CRUDE OIL
Filed Sept. 16, 1953   2 Sheets-Sheet 2

MERL R. LEONARD
INVENTOR.

BY Jack W. Hayden
ATTORNEY

United States Patent Office 2,792,119
Patented May 14, 1957

2,792,119

STRAINER CONSTRUCTION FOR CRUDE OIL

Merl R. Leonard, Levelland, Tex.

Application September 16, 1953, Serial No. 380,492

2 Claims. (Cl. 210—304)

The present invention relates to a filter construction for removing shale, scale, bolts and other debris from crude oil without interfering with the flow thereof.

At the present time, a great deal of difficulty is encountered in keeping the bottom of a crude oil storage tank clean. The problem is even more difficult where sour crude is involved, since such crude contains impurities which attack the tank in which it is stored, causing scale and corrosion to form thereon. Such scale drops off into the bottom of the tank along with any nuts or bolts which may have been loosened by the action of the impurities in the sour crude.

Pipe line companies will not remove oil from a tank where there is more than a four inch accumulation of water, solids, or other impurities on the bottom of a tank. This restriction is to protect the pipe lines from becoming clogged with the material which accumulates in a tank.

In some instances, not only are the impurities in the form of scale, which may be caused by the sour crude being handled, but such impurities may include gloves dropped into the tank by workmen, small tools, hydrometers and numerous other objects.

It can, therefore, be appreciated that a great deal of difficulty is experienced when draining the crude oil from a storage tank, either for the purposes of putting it in a pipe line, or for moving it to another tank in the tank battery. At the present time there is no filter available which will remove heavy debris such as scale, shale, bolts, nuts and gloves without materially restricting the flow of fluid through the filter itself. If the flow of crude is restricted, the pump may burn out or the tendency of the flow line to become clogged due to the settling of shale or heavy paraffin which may be present in the crude oil is increased.

The present invention is therefore directed to a filter construction which is adapted to filter crude oil without restricting the flow thereof.

Still another object of the invention is to provide a filter construction wherein a large volume reservoir is provided which includes a foraminated filter plate whereby crude oil flowing through the reservoir is filtered so as to remove debris therefrom.

Still another object of the invention is to provide a filter including a relatively large reservoir, a foraminated plate therein extending longitudinally of the reservoir and presenting a large filter surface area to the crude oil present in such reservoir and an opening for access to the reservoir whereby debris and other foreign materials separated from the crude oil may be cleaned out of the reservoir.

A still further object of the invention is to provide a filter for crude oil which is relatively simple in construction and operation so that any field man may easily clean the filter without the necessity of removing it from the system and taking it to a shop thus causing time and money loss.

Other objects and advantages will become more readily apparent from a consideration of the following description and drawings, wherein.

Figure 1:
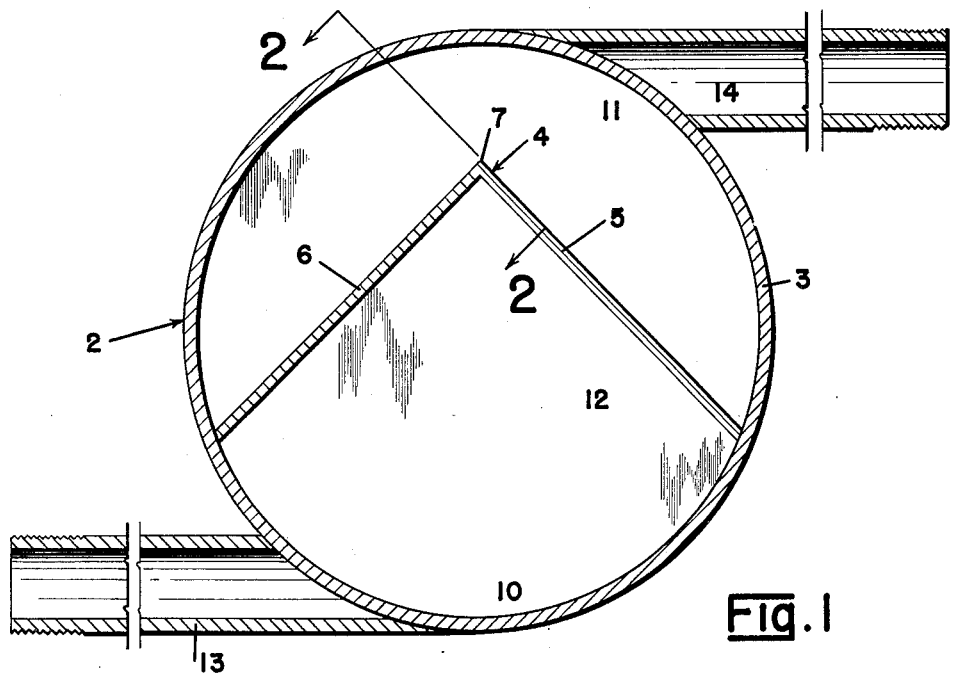
Fig. 1 is a sectional view illustrating the preferred embodiment of the filter housing with the foraminated plate therein.

In Fig. 1, the invention is denoted generally by the numeral 2 and is shown as including the housing 3, which may be of a cylindrical configuration as illustrated in the drawings. A foraminated plate 4, including legs 5 and 6 is mounted in the housing 3 and extends longitudinally thereof whereby crude oil flowing through the housing may be filtered. It is to be noted that the plates 5 and 6 are inclined with respect to the vertical and may be joined along their adjacent top edges 7 so as to form a filter plate of an inverted V arrangement.

Figure 2:
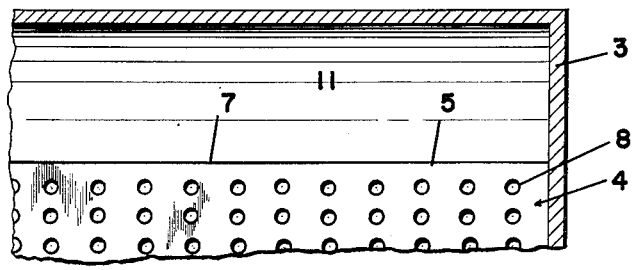
Fig. 2 is a sectional view on the line 2—2 of Fig. 1 showing the arrangement of openings in the plate to serve as a filter.

As shown in Fig. 2 of the drawings, each portion 5 and 6 of the plate includes a plurality of openings 8 therethrough to accommodate the passage of crude oil while separating therefrom debris such as shale, scale, nuts, bolts and the like which will fall into the bottom 10 of the housing. It is to be noted that the filter area of the plate 4 is increased by arranging the portions 5 and 6 in the housing 3 as illustrated in the drawings. Not only is the filter area of the plate increased so as to increase the filtering efficiency, but the possibility of restricting the flow of crude oil through the plate 4 is eliminated, since a large filter area is presented to the flow of crude.

This is extremely advantageous in a filter construction for crude oil, since such oil generally contains many impurities and debris which normally clogs filter arrangements quite readily. It is to be also noted that the plate 4, in effect, divides the housing 3 into an upper portion 11 and lower portion 12, the volume of such housing 3 being such that the flow of crude oil therethrough is relatively slow whereby the debris may settle therefrom.

In order to further inhibit clogging of the filter 4 and to increase the filtering efficiency of the filter, the inlet 13 to the housing is below the filter 4, as illustrated in Fig. 1 of the drawings. The outlet 14 is arranged on the opposite side of the filter 4 and at the top of the cylindrical housing 3. It is to be also noted that each of such openings intersect the housing tangentially, which increases the distance between the inlet and outlet and takes advantage of the volume of such housing so as to flow the crude therethrough smoothly and slowly, in order that the debris may settle therefrom.

Figure 3:
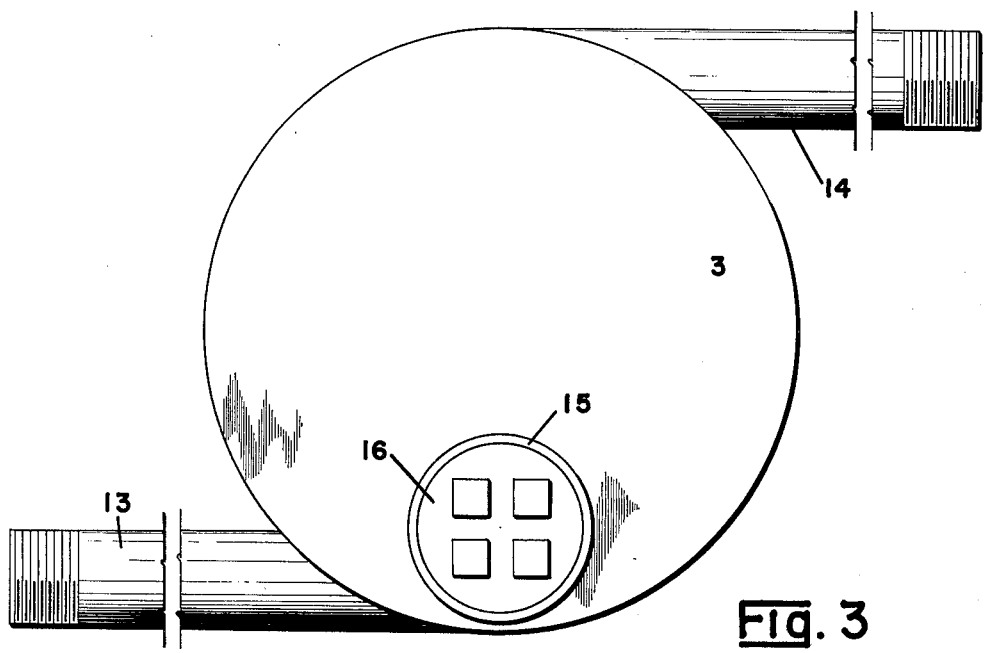
Fig. 3 is an end view of the filter showing the means for access to the housing whereby debris may be cleaned therefrom.
Figure 4:
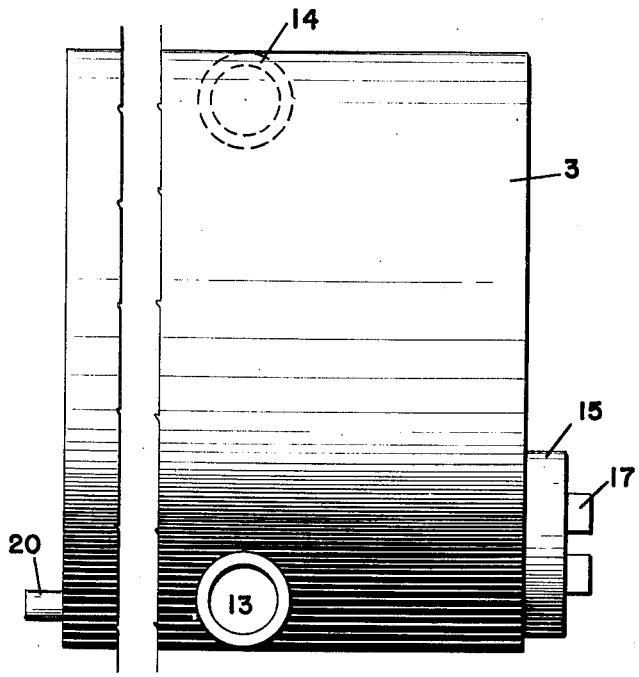
Fig. 4 is a side view of the filter illustrating the arrangement of the inlet and outlet openings to the filter reservoir.

It is desirable that suitable means be provided for access to the portion 12 of the housing 3 so that solids accumulated on the lower part 10 of such housing may be removed from time to time. It is desirable that such opening be as illustrated at 15 in Fig. 3 of the drawings, wherein such opening is shown as being large enough whereby the solids may be removed by inserting a hand longitudinally of the housing and raking the debris out the opening 15. Such opening may be normally closed by plug 16 which may be engaged with the opening by any suitable means such as threads or the like. Projections 17 on the plug are provided so that a tool may be engaged therewith and the plug rotated so as to disengage it from the opening 15. A plug having a diameter of four inches has been found quite satisfactory; however, it should be understood that such measurement is given by way of illustration only and the plug may be of any suitable size so as to accommodate quick removal of the sludge from the filter. A drain plug 20 is provided whereby the casing 3 may be drained.

A construction having the arrangement as described herein, wherein the cylindrical housing comprises 9⅝ inch casing, being 12 inches long has been found quite satisfactory in use with a pump which is designed to pump 41 barrels per hour. If the size of the pump is to be increased, it may be desirable to increase the dimensions accordingly so as to maintain a slow movement through housing 3 whereby the debris may be settled therefrom without clogging the filter 4.

Broadly, the invention relates to a filter for crude oil and more particularly to a filter which allows the removal from crude oil of debris without interfering with the flow thereof.

What is claimed is:

1. A crude oil filter for removing debris therefrom without restricting the flow of the crude oil through the filter comprising, a closed elongate housing having closed ends, a foraminated filter plate mounted in said housing, said filter plate being formed of two longitudinally extending leg portions which are joined together along their top edges to provide an inverted V arrangement, said housing having an inlet opening for admitting the crude oil below said filter plate, said housing also having an outlet opening positioned above said filter plate for discharging the crude oil from the housing after the debris has been separated from the crude oil, the longitudinal lower edges of said leg portions being positioned in contact with the housing and above said inlet opening and below the horizontal diameter of said housing, the longitudinal apex of said V arrangement of said leg portion being positioned above the horizontal diameter of said housing and below the outlet opening, the end edges of each of said leg portions being in contact with said closed ends of said housing whereby a chamber for trapping debris below said filter plate is provided within said housing, said chamber being unrestricted and without any obstructions therein, one of said closed ends of said housing having an access opening formed therein for access to said chamber and for the full length thereof, and a removable plate secured in said access opening so that upon the removal of such access plate, a rake or the like may be inserted into the lower end of the housing for raking or otherwise removing the accumulated debris in the bottom of said chamber and throughout the full length thereof.

2. A crude oil filter for removing debris therefrom without restricting the flow of the crude oil through the filter comprising, a closed elongate housing having closed ends, a foraminated filter plate mounted in said housing, said filter plate being formed of two longitudinally extending leg portions which are joined together along their top edges to provide an inverted V arrangement, said housing having an inlet opening for admitting the crude oil below said filter plate, said housing also having an outlet opening positioned above said filter plate for discharging the crude oil from the housing after the debris has been separated from the crude oil, the longitudinal lower edges of said leg portions being positioned in contact with the housing and above said inlet opening and below the horizontal diameter of said housing, the longitudinal apex of said V arrangement of said leg portion being positioned above the horizontal diameter of said housing and below the outlet opening, the end edges of each of said leg portions being in contact with said closed ends of said housing whereby a chamber for trapping debris below said filter plate is provided within said housing, and an inlet pipe connected to said inlet opening and disposed at an angle with respect to a plane passing through said apex and bisecting the angle between said leg portions for directing the crude oil entering said chamber away from the apex of said foraminated filter plate to prevent clogging thereof and damage thereto by relatively large and heavy objects in the crude oil.

References Cited in the file of this patent

UNITED STATES PATENTS

| Number | Name | Date |
| --- | --- | --- |
| 192,313 | Watson | June 19, 1877 |
| 603,120 | Worthington | Apr. 26, 1898 |
| 622,217 | Fuller et al. | Apr. 4, 1899 |
| 1,140,720 | Simons | May 25, 1915 |
| 1,405,876 | Summers | Feb. 7, 1922 |
| 1,638,545 | Mueller et al. | Aug. 9, 1927 |
| 1,720,433 | Parker | July 9, 1929 |
| 1,971,733 | Shimer | Aug. 28, 1934 |